US006407985B1

(12) United States Patent
Jain

(10) Patent No.: US 6,407,985 B1
(45) Date of Patent: Jun. 18, 2002

(54) LOAD SHARING OVER BLOCKED LINKS

(75) Inventor: Praveen Jain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/106,798

(22) Filed: Jun. 29, 1998

(51) Int. Cl.[7] .............................................. H04J 3/24
(52) U.S. Cl. ...................................................... 370/256
(58) Field of Search ................................ 370/256, 254, 370/252, 401, 402, 403, 412, 392, 407, 405, 408, 428, 389, 399, 409, 390, 406

(56) References Cited

U.S. PATENT DOCUMENTS

| 5,088,032 A | 2/1992 | Bosack ........................ 395/200 |
| 5,241,682 A | 8/1993 | Bryant et al. ................ 395/800 |
| 5,274,631 A | 12/1993 | Bhardwaj ..................... 370/60 |
| 5,274,643 A | 12/1993 | Fisk ........................... 370/94.1 |
| 5,280,480 A | 1/1994 | Pitt et al. ................... 370/85.13 |
| 5,291,482 A | 3/1994 | McHarg et al. ............... 370/60 |
| 5,319,644 A | 6/1994 | Liang ......................... 370/85.5 |
| 5,331,637 A | 7/1994 | Francis et al. ................ 370/54 |
| 5,359,592 A | 10/1994 | Corbalis et al. .............. 370/17 |
| 5,408,472 A | 4/1995 | Hluchyj et al. ............. 370/94.1 |
| 5,430,715 A | 7/1995 | Corbalis et al. .............. 370/54 |
| 5,509,006 A | 4/1996 | Wilford et al. ............... 370/60 |
| 5,513,172 A | 4/1996 | Shikama et al. .............. 370/13 |
| 5,541,957 A | 7/1996 | Lau ........................... 375/258 |
| 5,561,669 A | 10/1996 | Lenney et al. ............. 370/60.1 |
| 5,583,862 A | 12/1996 | Callon ........................ 370/397 |
| 5,594,727 A | 1/1997 | Kolbenson et al. ......... 370/442 |
| 5,594,732 A | 1/1997 | Bell et al. ................... 370/401 |
| 5,699,521 A | 12/1997 | Iizuka et al. ........... 395/200.15 |
| 5,732,079 A | 3/1998 | Castrigno ................... 370/362 |
| 5,734,654 A | 3/1998 | Shirai et al. ................. 370/396 |
| 5,737,526 A | 4/1998 | Periasamy et al. ..... 395/200.06 |
| 5,742,604 A | 4/1998 | Edsall et al. ................ 370/401 |
| 5,796,732 A | 8/1998 | Mazzola et al. ............. 370/362 |
| 5,802,316 A | 9/1998 | Ito et al. ................. 395/200.79 |
| 5,805,595 A | 9/1998 | Sharper et al. .............. 370/442 |
| 5,835,481 A | 11/1998 | Akyol et al. ................ 370/216 |
| 5,835,727 A | * 11/1998 | Wong et al. ................. 370/241 |
| 5,872,783 A | 2/1999 | Chin .......................... 370/392 |
| 5,913,037 A | 6/1999 | Spofford et al. ........ 395/200.56 |
| 6,094,434 A | * 7/2000 | Kotzur et al. ............... 370/401 |
| 6,233,242 B1 | * 5/2001 | Mayer et al. ............... 370/412 |

* cited by examiner

Primary Examiner—Dang Ton
(74) Attorney, Agent, or Firm—Theeen Reid & Priest LLP; David B. Ritchie

(57) ABSTRACT

In order to load share non-configuration message traffic on more than one port of a non-root spanning tree protocol compliant switching node, upon receiving a spanning tree algorithm port-blocking message, the switching node assigns a port filter to each of its non-designated ports. The switching node then directs a spanning tree non-configuration message through a port that has a port filter which corresponds to the non-configuration message. The switching node may be implemented using any learning switch, or equivalent device, which complies with a spanning tree algorithm, has sufficient memory to store the port filters used, a means for applying the port filters to its non-designated ports, and a means for directing at least one spanning tree non-configuration message to a port having a port filter that corresponds to the non-configuration message. The switching node may be implemented on any spanning tree compliant network, such as a IEEE 802.1d network, as long as the network includes at least one other learning switch which is selected as the root switch for the network.

57 Claims, 4 Drawing Sheets

LOAD SHARING OVER BLOCKED LINKS

BACKGROUND OF THE INVENTION

1. Field of the Invention

The present invention relates generally to communications networks. More particularly, the present invention relates to load of sharing spanning tree non-configuration messages, such as data packets, over more than one port of a switching node within a communications network.

2. The Background Art

FIG. 1 is a schematic diagram of a typical communications network 10 having switches 12, 14, 16 and 18 which are interconnected to form a spanning tree (loop-free) topology. System 10 includes switch 12 coupled to switch 14 through link 20. Switch 14 is coupled to switch 16 through link 22 and switch 18 through link 24. Switch 18 is coupled to a network 26, such as the Internet, through link 27. A link is a connection between two switches and may be provided using any compatible transmission medium, such as a twisted pair, fiber optic, coaxial, wireless or equivalent medium.

A switch is commonly known as a device which receives a packet from another switch or station and transmits the packet to another switch or station. A station may be a personal computer, work station, printer, or similar device, which does not store and forward a packet upon receipt to another switch or station. The switch has at least two forwarding ports for coupling to at least one other switch and/or at least one station, enabling the switch to send or receive packets to each coupled switch or station. For example, switch 12 may have ports 28a through 28n which are coupled to stations 30a through 30n. Switch 12 also may have ports 32a through 32n which are available for receiving or transmitting packets from another switch, such as switch 14. Switch 14 is similar to switch 12 except that its ports are only coupled to ports of other switches and thus, may be designed to provide high packet throughput through its ports. Port 34a is shown coupled to port 32a of switch 12, port 34n of switch 14 is shown coupled to port 36n of switch 16, and port 38a of switch 14 is shown coupled to port 40a of switch 18. Switch 16 may also include additional ports for coupling with stations, such as ports 44a through 44n which are shown coupled to stations 46a through 46n, respectively.

Each switch is a learning switch that promiscuously listens for packets through its ports that either have a link established with another switch or with a station. If the packet has been previously "learned," i.e., its source address and the port upon which the packet was received by the switch have been previously stored in a forwarding table, the packet is forwarded to the port specified in the forwarding table. (Forwarding tables and their uses in switching networks are well known to those of ordinary skill in the art.) If the packet has not been previously learned, then the switch learns the packet in the forwarding table and forwards the packet on all of its ports except the port upon which the packet was received.

Because a learning switch transmits a packet on all of its ports, except the port upon which the packet was received, a situation may occur where an infinite number of packet copies may be spawned if the switches have more than one link between each other and if the packet received has not been previously learned. This result may be described by the following discussion which is directed to FIG. 2.

FIG. 2 is a partial schematic diagram of communications network 11 having learning switches 12, 16 and 14 which are not interconnected to form a spanning tree topology. Switch 12 and switch 14 are coupled through link 20 at ports 32a and 34a, respectively, and through link 50 at ports 32n and 34b, respectively. Link 20 and link 50 create a loop between switch 12 and switch 14.

If switch 12 transmits a packet through link 20 to switch 14, switch 14 will receive the packet and check to see if the packet has a destination address that has been previously been used. If not, switch 14 sends copies of the packet to all of its ports, except port 34a which is the port upon which the packet was received. This results in switch 12 receiving a copy of the packet, checking the destination address of the packet copy, using the destination address as an index in its forwarding table (not shown) to determine which port to use, and transmitting the packet copy to that port, which is port 32a. This results in switch 14 receiving the packet copy, using its forwarding table (not shown) to determine which port to use, which in this case, would include more than one port including port 34b, making additional copies of the packet copy, and sending the copies to the ports previously used. Thus, packets transmitted on a communications network that uses learning switches which are not interconnected to have a spanning tree topology, may not only infinitely loop between switches but may also infinitely proliferate because for each hop between switches, additional packets are generated.

One known solution to this problem is to impose a spanning tree algorithm (STA) on a network having learning switches so that the network has a loop-free topology, such as communications network 10 shown in FIG. 1. Spanning tree algorithms are known in the art and typically include a step of selecting a root switch in the network. The STA then calculates a loop-free path between the root switch and all other switches on the network.

The STA creates the loop-free path by dynamically selecting a "forwarding" port as a "root" port and blocking packet traffic from all other forwarding ports ("blocked ports") in each switch which are not "designated" ports. Those of ordinary skill in the art will recognize that a link connected to a blocked port is precluded from sending packet traffic through that port, rendering the link a blocked link. Forwarding ports are ports configured within a spanning tree to forward or receive packets from a root switch. Designated ports are forwarding ports which cannot be blocked or selected as a root port, such as ports that are connected to another station or to a root switch.

For example, referring again to FIG. 1, in response to a STA port blocking message, switch 12 selects a root port, such as port 32a, and blocks ports that are non-designated ports, such as ports 32b through 32n. Ports 30a through 30n are not blocked because they are designated ports. No packet traffic flows through blocked ports, eliminating the above-described problem of creating an infinite number of packet copies. The only time a blocked port is used is when a link breaks between switches. When this occurs, the original root port is blocked and a blocked port is selected as the new root port. Thus, each switch within the network does not only ultimately link to every switch so that packets can be transmitted or received between every device of communications network 10 but each switch also does not form a loop between any other switch on the network. Such a system is known as a network having a loop-free or spanning tree topology.

However, a network with a loop-free topology suffers from the disadvantage that only one link may be used between switches, even though blocked ports may be available to share the packet traffic with the root port. This prevents sharing the total packet traffic load over non-designated ports which may be otherwise available for transmitting or receiving packets and is thus, not fully utilized or as efficient as possible.

Accordingly, a need exists where at least one blocked port may be utilized to share packet traffic load with a selected root port, while ensuring that packet copies are not infinitely generated and transmitted between learning switches.

SUMMARY OF THE INVENTION

The present invention is directed to load sharing non-configuration message traffic on more than one port of a non-root spanning tree protocol compliant switching node. Upon receiving a spanning tree algorithm port-blocking message, the switching node assigns a port filter to each of its non-designated ports, and then directs a spanning tree non-configuration message through a port that has a port filter which corresponds to the non-configuration message.

The switching node may be implemented using any learning switch, or equivalent device, which complies with a spanning tree algorithm, has sufficient memory to store the port filters used, a means for applying the port filters to its non-designated ports, and a means for directing at least one spanning tree non-configuration message to a port having a port filter that corresponds to the non-configuration message.

The switching node may be implemented on any spanning tree compliant network, such as a IEEE 802.1d network, as long as the network includes at least one other learning switch which is selected as the root switch for the network.

DETAILED DESCRIPTION OF THE PREFERRED EMBODIMENTS

In the following description, a preferred embodiment of the invention is described with regard to preferred process steps and data structures. However, those skilled in the art will recognize, after perusal of this application, that embodiments of the invention may be implemented using a set of general purpose computers operating under program control, and that modification of a set of general purpose computers to implement the process steps and data structures described herein would not require undue invention.

Figure 3:
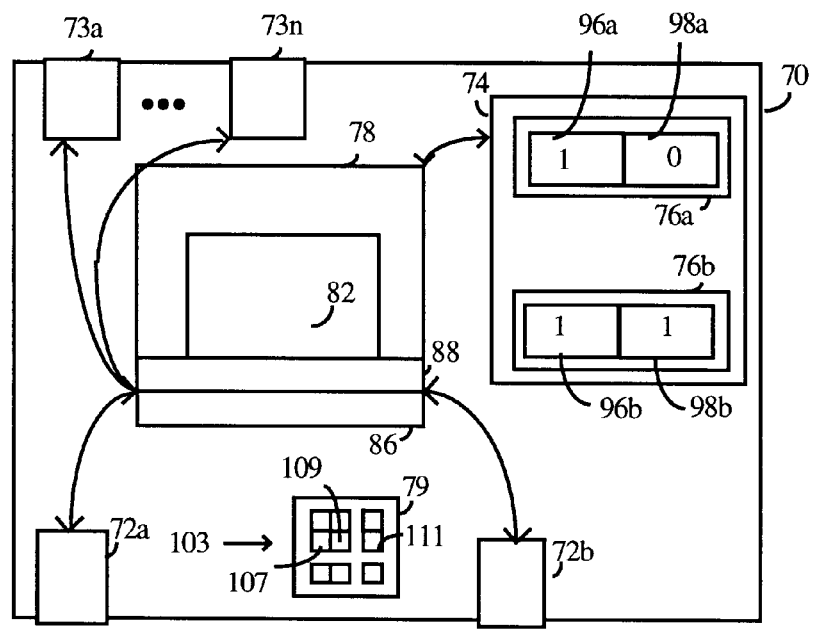
FIG. 3 is a block diagram of a switching node which is capable of sharing message traffic over more than one load sharing port in accordance with a presently preferred embodiment of the present invention.

FIG. 3 is a block diagram of a switching node which is capable of sharing message traffic over more than one load sharing port in accordance with a presently preferred embodiment of the present invention.

Switching node 70 includes a set of load sharing ports 72a and 72b, a set of non-load sharing ports 73a through 73n, a memory 74 for storing a set of port filters 76a and 76b, a means 78 for applying port filters 76a and 76b to their respective ports 72a and 72b in response to a spanning tree algorithm port-blocking message (not shown), a forwarding table 79, and a means 82 for directing a non-configuration message 84 (shown in FIG. 4) through a port that has a port filter which corresponds to non-configuration message 84.

Switching node 70 may be a switch that listens for any message posted on its ports, learns each message transmitted, and runs a spanning tree algorithm or one that complies with the IEEE 802.1d protocol, and which is appropriately configured as described herein. In accordance with a presently preferred embodiment of the present invention, switching node 70 may be a switch, model Catalyst 5000 switch, available from Cisco Systems of San Jose, Calif. Note that the IEEE 802.1d protocol is a standard protocol well known to those of ordinary skill in the art.

The number of port filters or the number of ports shown is not intended to be limiting in any way other than that the each port selected for load sharing requires a corresponding port filter. Means for directing relies on a transmitter 86 and a receiver 88 used for transmitting or receiving messages on ports 72a through 72b and 73a and 73b, respectively. Transmitter 86 and receiver 88 are known in the art.

Memory 74 is configured to store a port filter for each of the non-designated ports available in switching node 70, where port filters 76a and 76b correspond to ports 72a and 72b. For each port filter assigned to a non-designated port, a filter mask and a filter value are specified. Switch 70 is shown having port filter 76a with a filter mask 96a of "1" and a filter value 98a of "0", and port filter 76b with a filter mask 96b of "1" and a filter value 98b of "1". Filter mask 96a is used to define the width of a selected portion 99 of non-configuration message 84 which is to be compared with filter value 98a to monitor. The number of bits selected by filter mask 96a is dependent on the number of ports available for load sharing although any number of bits may be used so long as there are at least the same number of ports available for use for load sharing as there are binary values defined by the number of bits set by filter mask 96a, i.e., there must be $2^N$ ports available for load sharing for a filter mask of N, where one of the $2^N$ ports includes a port selected as the root port within the switching node.

For example, if filter mask 96a is set to one, then there must be at least two ports available within switching node 70 that are available for load sharing message traffic because there are two possible binary values that may be defined within a single bit position. Similarly, a filter mask set to two requires four ports that may be used to share traffic load.

Figure 4:
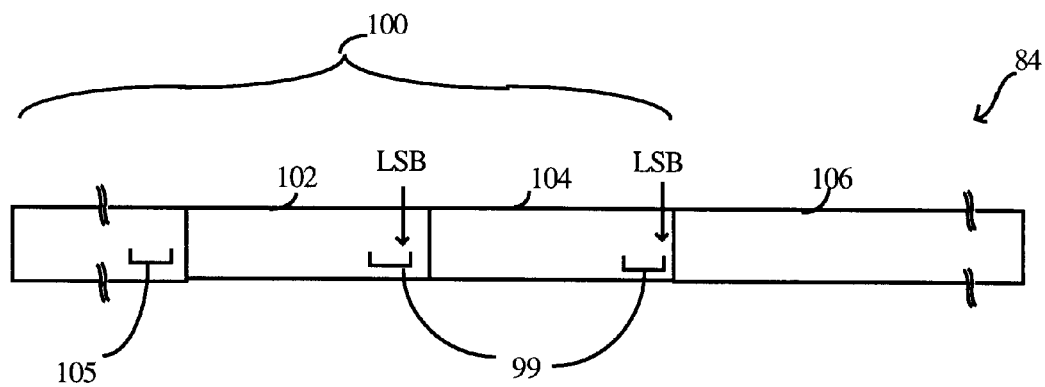
FIG. 4 is a block diagram of a non-configuration message having a header portion which includes a source address and a destination address in accordance with a presently preferred embodiment of the present invention.

FIG. 4 is a block diagram of a non-configuration message 84 having a message format that includes a header portion having a source address, a destination address, and an additional bit position for signifying whether the message has been previously sent through a load sharing port in accordance with a presently preferred embodiment of the present invention.

Non-configuration message 84 includes a header 100 portion having a destination address 102 ("DA") and a source address 104 ("SA") and a data portion 106. Non-configuration message 84 may be any message type, other than a configuration bridge protocol data unit ("configuration BPDU"), that belongs within a class of packet types defined by the IEEE 802.1d standard. Configuration BPDU are special messages used by switching nodes that comply with a spanning tree algorithm to calculate a loop-free path.

Non-configuration message 84 may also include an addition bit position 105 within header 100. As known by those of ordinary skill in the art, a switch (which is not configured for load sharing as described in herein) does not transmit a message using the same port upon which the message was previously received. This avoids the problem of infinitely generating messages as described in the background section above. Similarly, a non-root load sharing switch, such as switch 70, must also not allow its any of its load sharing ports to transmit a message which was received by any of its load sharing ports.

Additional bit position 105 permits a non-root load sharing switching node to determine whether message 84 has been received through a load sharing port. If so, and if message 84 has been previously learned and previously received on a non-load sharing port by switching node 70, message 84 is dropped. This avoids any possibility of message 84 being infinitely transmitted between switching node 70 and an another node. The use of the additional bit position is further discussed below.

Filter value 98a or 98b (FIG. 3) specifies a value to use for matching with the selected portion of non-configuration message 84. In accordance with a preferred embodiment of the present invention, selected portion 99 is taken from the least significant bit ("LSB") position of either a destination address 102 or a source address 104 contained within header portion 100 of message 84, depending on whether message 84 is being received or transmitted by switching node 70. Selected portion 99 is not intended to be in any way limiting. Other selected portions may be used such as the most significant bit ("MSB") position of an address.

Turning to FIG. 3, forwarding table 79 is for storing at least one message entry 103, enabling switching node 70 to learn messages transmitted through one of its ports. Message entry 103 includes a port designation field 107 for storing the port designation corresponding to a port upon which a message was received. Message entry 103 also includes a source address field 109 for storing the source address of the received message. This enables a switching node to learn the port used to receive a prior message having a particular source address and to use the same port when transmitting subsequent messages having a destination address which matches the source address. Forwarding tables having a port designation field and a source address field are known in the art.

In accordance with a presently preferred embodiment of the present invention, forwarding table 79 also includes an additional field 111 for each message entry. Additional field 111 is for indicating the type of port, load sharing or non-load sharing, that was used in receiving the learned message. For example, if additional field 111 is defined to have a singled field width, a bit set high within the field may be used to indicate that the message corresponding to the field was received through a non-load sharing port. This enables switching node 70 to avoid infinitely looping learned messages between itself and another switching node.

The use of additional field 111 in forwarding table 79 position is further discussed below.

Figure 5:
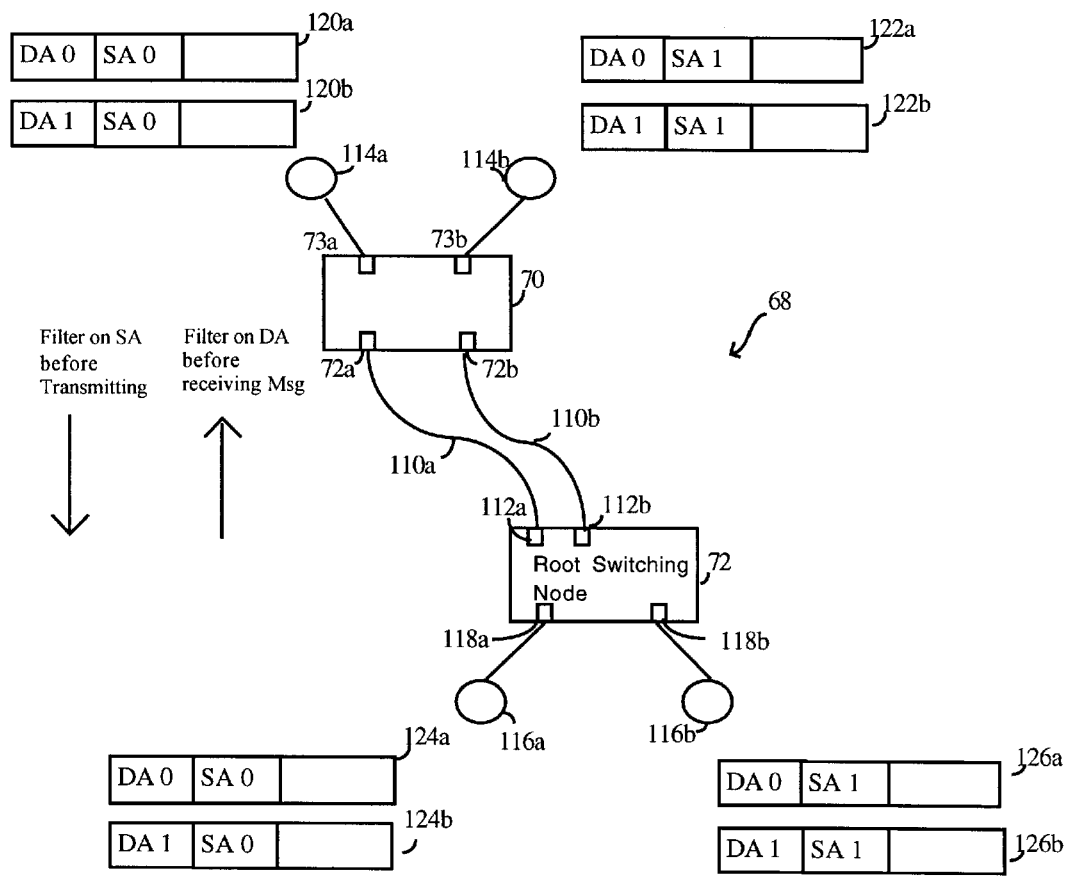
FIG. 5 is a schematic diagram of a communications network having at least one switching node which is capable of sharing message traffic load over more than one port in accordance with a presently preferred embodiment of the present invention.

FIG. 5 is a schematic diagram of a communications network which is configured to have at least one load-sharing switching node in accordance with a preferred embodiment of the present invention.

Switching node 70 is shown coupled to switching node 72 through link 110a and link 110b through ports 72a through 72b and ports 112a through 112b, respectively. Switching node 70 is also shown coupled to stations 114a and 114b through ports 73a and 73b, respectively. Switching node 72 is shown coupled to stations 116a and 116b through ports 118a through 118b.

The number of switches and the network configuration shown in FIG. 5 are not intended to be limiting in any way but are shown simply to help describe a presently preferred embodiment of the present invention. For example, the present invention may have the same network configuration shown in FIG. 1. Any number of switching nodes and interconnects may be used so long as each switching node receives or transmits messages on its ports, learns previously received or transmitted messages, complies with a spanning tree algorithm, and there is at least one switching node, such as switching node 70, that has been configured to provide load sharing of non-configuration messages through more than one port.

Figure 1:
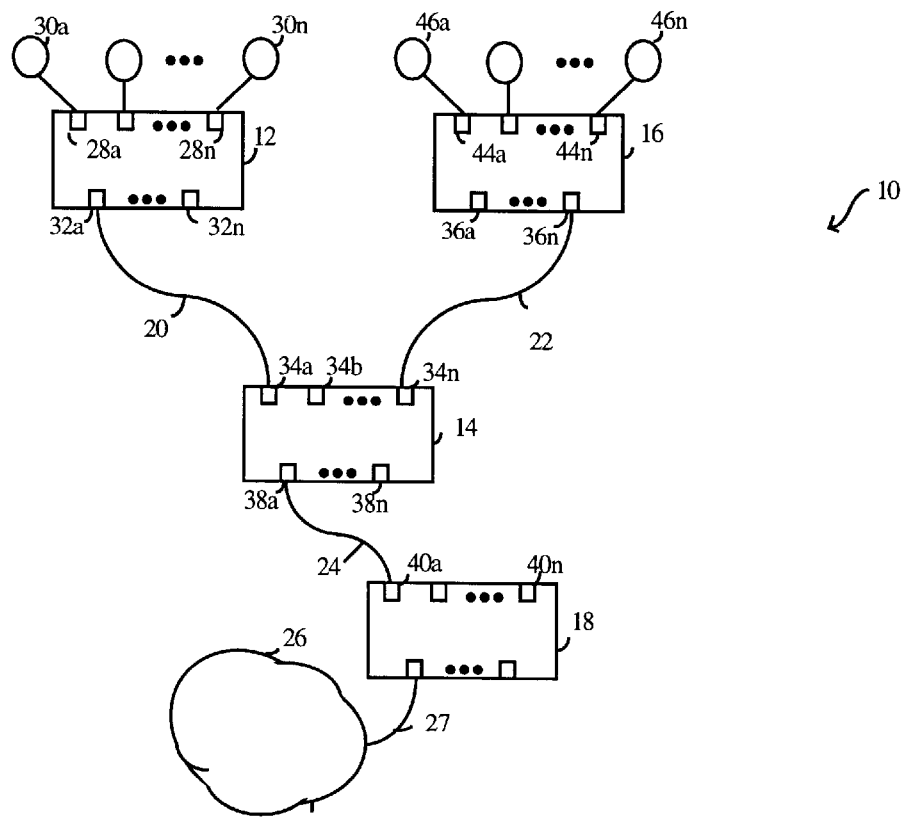
FIG. 1 is a schematic diagram of a typical communications network having switches which are interconnected to form a spanning tree (loop-free) topology.
Figure 2:
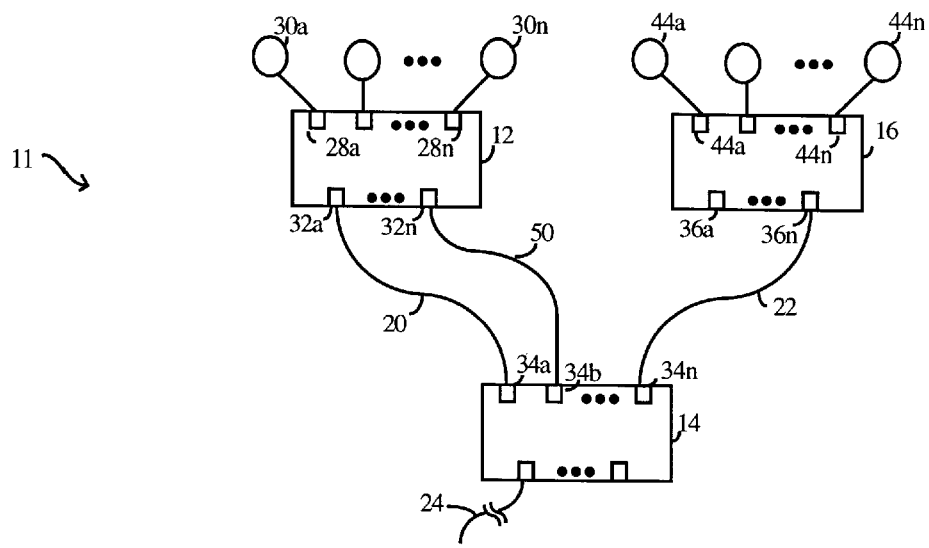
FIG. 2 is a partial schematic diagram of a communications network having learning switches which are not interconnected to form a spanning tree topology.

The present invention remains compatible with existing networks having learning switches which use a STA to create a loop-free interconnection, such as 802.1d compliant communications network 10 shown in FIG. 1. The present invention is also scalable because a load-sharing switching node can receive or transmit messages from any number of load sharing and non-load sharing switching nodes.

Those of ordinary skill in the art will recognize that a single root switching node is selected between or among spanning tree algorithm ("STA") compliant switching nodes. In FIG. 5, switching node 72 is defined as the root switching node for network 68. All other switching nodes not selected as a root switch are defined as non-root switches, such as switch 70. In accordance with a presently preferred embodiment of the present invention, only non-root switching nodes may be configured to provide load sharing of message traffic. Those of ordinary skill in the art will recognize that a switching node selected as a root switch by default uses more than one port to send or receive messages and thus, does not need to be configured to provide load-sharing.

When a non-root switching node, such as switching node 70, is configured for message load sharing and upon reception of a STA port blocking message, switching node 70 configures some of its ports to load sharing ports by applying port filters to the ports. Only a non-designated port, such as a root port or blocked port that is operational and connected to a working link, may be selected as a load sharing port. Port filters are not applied to designated ports, such as ports coupled to stations.

Switching node 70 directs any non-configuration message received from either a load sharing port or a non-load sharing port by transmitting each non-configuration message through ports having a respective port filter that corresponds to the non-configuration message when required. This allows a switching node so configured (hereinafter known as a "load-sharing switching node") to share message traffic load on at least one port other than a selected root port.

Table 1 shows the load sharing ports used by switching node 70 (see FIG. 5) for a given message traffic direction using a non-configuration message having a given source address and a destination address. The results are based on stations 114a and 114b having station addresses that include bit values 0 and 1 at the LSB position, respectively, and stations 116a and 116b having station addresses that include bit values 0 and 1 at the LSB position, respectively.

TABLE 1

| Message Traffic Direction | DA | SA | Load Sharing Port Used - Transmit | Load Sharing Port Used - Receive |
|---|---|---|---|---|
| 114a -> 116a | 0 | 0 | 72a | |
| 114a -> 116b | 1 | 0 | 72a | |
| 114b -> 116a | 0 | 1 | 72b | |
| 114b -> 116b | 1 | 1 | 72b | |
| 116a -> 114a | 0 | 0 | | 72b |
| 116a -> 114b | 0 | 0 | | 72a |
| 116b -> 114a | 1 | 1 | | 72b |
| 116b -> 114b | 1 | 1 | | 72a |

Row 1 reflects the case where a message 120a, having a source address with a selected portion having a value of 0, is sent from station 114a to station 116a. Switching node 70 receives message 120a unfiltered through non-load sharing port 73a. Assuming that message 120a has not yet been learned within forwarding table 79, switching node 70 forwards message 120a to all of its ports. Load sharing port 72a transmits message 120a to station 114b unrestricted, while port 73a drops message 120a because it was the same port through which message 120a was received.

As described above, switching node 70 filters on the source address of all messages intended for transmission by a load-sharing port. The selected portion of the destination address of message 120a is not checked. Thus, upon forwarding to load sharing ports 72a and 72b, message 120a is filtered and either dropped or transmitted depending on whether message 120a corresponds to a port filter associated with a particular port. In the present example, message 120a is transmitted only by port 72a because it has a respectively port filter having a port value which corresponds to the selected portion of the source address of message 120. Port 72b drops message 120a because its associated port filter value is set to 1 which does not correspond to the selected portion of the source address of message 120a.

Similarly, as shown in row 2 of Table 1, if message 120b is transmitted from station 114a to station 116b load-sharing port 72a transmits the message, while port 72b drops the message. Message 120b is shown having a source address with a selected portion having a value of 0 since it is transmitted from the same station, station 114a, as message 120a.

Row 3 reflects the case where a message 122a, having a source address with a selected portion having a value of 1, is sent from station 114b to station 116a. Switching node 70 receives message 122a unfiltered through non-load sharing port 73b. Assuming that message 122a has not yet been learned within forwarding table 79, switching node 70 forwards message 122a to all of its ports. Load sharing port 72b transmits message 122a unrestricted, i.e., without any filtering applied. Load sharing port 72a drops message 122a, while port 73b drops message 122a because port 73b was the port through which message 122a was previously received.

Switching node 70 filters on the source address of all messages intended for transmission by a load sharing port. The selected portion of the destination address of message 122a is not checked. Thus, upon forwarding to load sharing ports 72a and 72b, message 122a is filtered and either dropped or transmitted depending on whether message 122a corresponds to a port filter associated with a particular port. In the present example, message 122a is transmitted only by port 72b because it has a respectively port filter having a port value which corresponds to the selected portion of the source address of message 122. Port 72a drops message 122a because its associated port filter value is set to 0 which does not correspond to the selected portion of the destination address of message 122.

Similarly, as shown in row 4 of Table 1, if message 122b is transmitted from station 114b to station 116b, load-sharing port 72b transmits the message, while port 72a drops the message. Message 122b is shown having a source address with a selected portion having a value of 1 since it is transmitted from the same station, station 114b, as message 122a.

Row 5 reflects the case where message 124a, having a destination address with a selected portion having a value of 0, is sent from station 116a to station 114a. Switching node 72 receives message 124a through port 118a. Since switching node 72 is a root node and is not configured for load sharing as described in herein, it behaves like any other learning switching node which complies with a spanning tree algorithm.

Assuming message 124a has not yet been learned by switching node 72, it forwards message 124a to all of its ports. Load sharing ports 72a and 72b of switching node 70 receive message 124. As described above, load sharing ports filter on the destination address of all incoming messages. Hence, message 124a is not dropped by port 72a because it has a respectively port filter having a port value which corresponds to the selected portion of the destination address of message 124. Port 72b drops message 124a because its associated port filter value is set to 1 which does not correspond to the selected portion of the destination address of message 124a.

Similarly, as shown in row 6 of Table 1, if message 124b is transmitted from station 116b to station 114b, load-sharing port 72a receives the message, while port 72b drops the message.

Row 7 reflects the case where message 126a, having a destination address with a selected portion having a value of 1, is sent from station 116b to station 114a. Switching node 72 receives message 126a through port 118b. Assuming that message 126a has not yet been learned by switching node 72, it forwards message 126a to all of its ports. Again, in the examples described for rows 5 and 6 of Table 1, load sharing ports filter on the destination address of all incoming messages. Hence, message 126a is not dropped by 72b because it has a respectively port filter having a port value which corresponds to the selected portion of the destination address of message 84. Port 72a drops message 126a because its associated port filter value is set to 0 which does not correspond to the selected portion of the destination address of message 126.

Similarly, as shown in row 8 of Table 1, if message 126b is transmitted from station 116b to station 114b, load-sharing port 72b receives the message, while port 72a drops the message.

Figure 6:
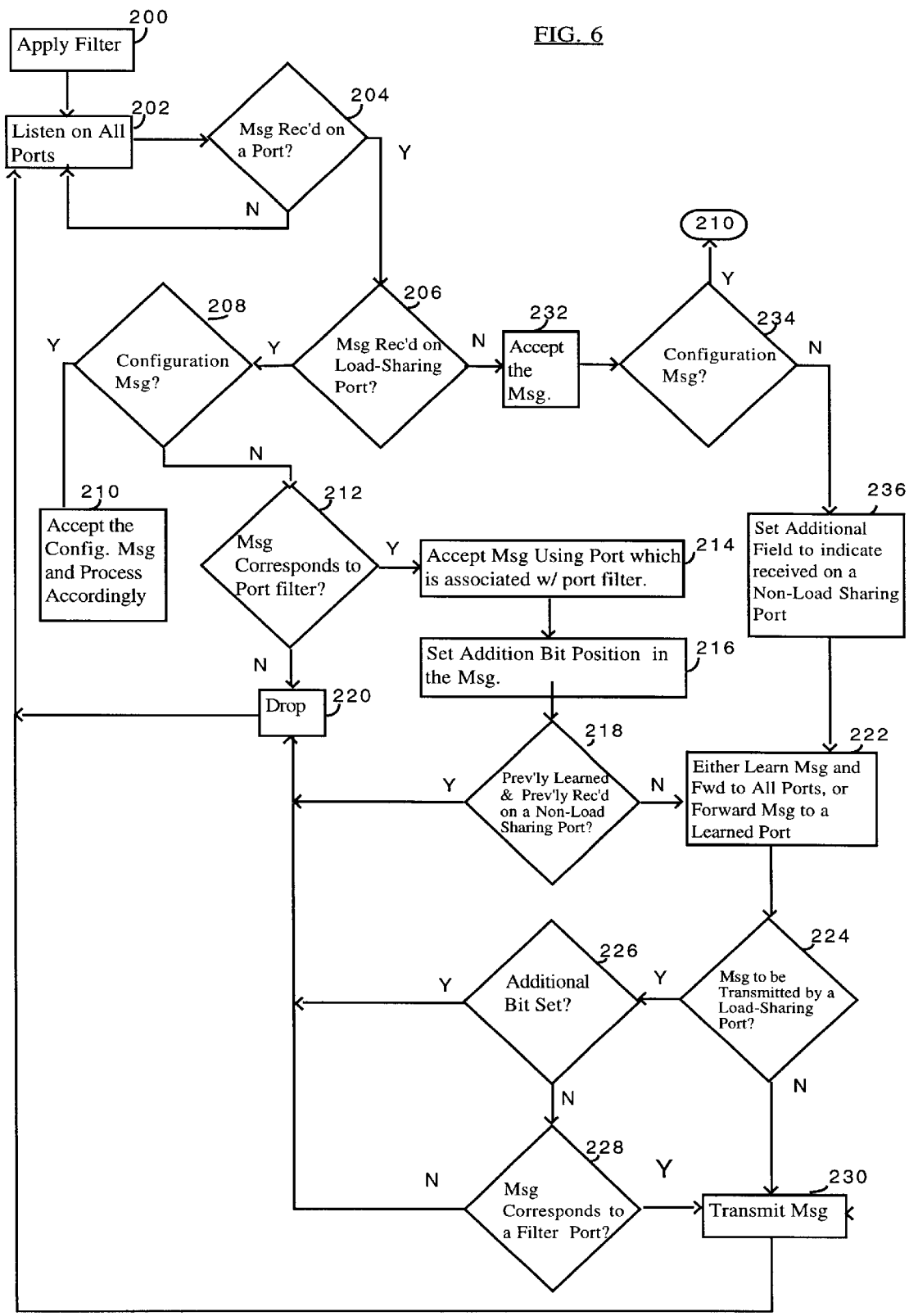
FIG. 6 is a flow diagram of a method for sharing message traffic load over more than one port in a network which uses a spanning tree algorithm in accordance with a presently preferred embodiment of the present invention.

FIG. 6 is a process flow showing a method for load sharing non-configuration message traffic on more than one port of a non-root STA switching node in accordance with a preferred embodiment of the present invention.

At step 200, upon receipt of a STA port-blocking message, a non-root STA-compliant switching node, such as switching node 70 in FIGS. 3 and 4, configures its ports, which are selected for load sharing non-configuration message traffic, by assigning a port filter to each of the selected ports.

At step 202, the switching node listens promiscuously for messages posted on all of its ports, including load sharing and non-load sharing ports.

At step 204, if a message is received at a port, step 206 is performed. Otherwise, the switching node continues to listen for messages.

At step 206, the switching node determines whether the message was received on a load sharing port. If so, step 208 is performed. Otherwise, step 232 is performed.

At step 208, the message is checked to determine whether it is a configuration message, such as a configuration BPDU, and if so, step 210 is performed.

At step 210, the configuration BPDU is accepted by the switching node and is processed accordingly as known by those of ordinary skill in the art.

If at step 208, the message is not a configuration message, ("non-configuration message"), step 212 is performed.

At step 212, the message is checked to determine whether it corresponds with the port filter associated with the port upon which the message was received. The load sharing port determines whether it has a port filter that corresponds with a selected portion of a destination address within the header of the message. If the selected portion corresponds with a filter value associated with the port, step 214 is performed.

In accordance with a preferred embodiment of the present invention, the destination address ("DA") is a destination address corresponding to a media access controller ("MAC") address; and the selected portion, such as selected portion 99 described in FIG. 4, is taken from the least significant bit position of the DA and has a width defined by the port filter mask associated with the port.

At step 214 the message is accepted using a port which is associated with a port filter that corresponds to the message.

At step 216, an additional bit position within the message is set to indicate that the message was received by a load sharing port. In accordance with a preferred embodiment of the present invention, the additional bit position is defined within a header portion of a message. This bit position may be implemented using the format described for non-configuration message 84 in FIG. 5, above. One such header portion having available bit positions for an additional bit position is used in the Catalyst 5000 switch architecture available from Cisco Systems of San Jose, Calif. This implementation is not intended to limit the present invention in any way. Other implementations may be used to enable a switching node to determine whether a message received has been previously received through its load sharing ports and would be apparent to those of ordinary skill in the art without undue experimentation.

At step 218, the message is checked to determine whether it was previously learned and previously received on a non-load sharing port. If so, step 220 is performed by dropping the message. Switching node then returns to step 202 to listen for additional messages.

As known to those of ordinary skill in the art, a typical spanning tree-compliant switching node learns every message received by storing the port designation of the port and the source address from which the message was received. In accordance with a preferred embodiment of the present invention, a load sharing switching node uses a forwarding table that has an additional field (such as forwarding table 79 and additional field 111, respectively, in FIG. 3) for each message entry in the table. This additional field is for indicating when a message, which corresponds to the message entry, was received by the switching node through a non-load sharing port. This enables the switching node to avoid the endless looping of the message should the message be received again by the same switching node through a load sharing port simply by checking the forwarding table to determine whether the message was previously learned and whether it was previously received through a non-load sharing port. For example, the additional field may contain a single width bit which if set high, signifies that the learned message was received through a non-load sharing port.

If at step 218, the message was not previously learned and previously received through a non-load sharing port, step 222 is performed. At step 222, the message is either learned and forwarded to all available ports (if not previously learned); or forwarded to a learned port (if previously learned).

At step 224, if the message is to be transmitted by a load sharing port, step 226 is performed by determining whether the additional bit position, such as additional bit position 105, has been set. If so, the message is dropped by performing step 220 and the switching node returns to step 202 to listen for additional messages.

If at step 226, the additional bit was not set, step 228 is performed.

At step 228, each of the load sharing ports determines whether a port filter corresponds with a selected portion of a source address within the header of the message. If the selected portion corresponds with a filter value associated with a port, step 230 is performed by transmitting the message through a load sharing port which is associated with the port filter that corresponds to the message. The switching node returns to step 202 to listen for additional messages.

In accordance with a preferred embodiment of the present invention, the source address ("SA") is a source address corresponding to a MAC address, and the selected portion, such as selected portion 99 described in FIG. 4, is taken from the least significant bit position of the SA and has a width defined by the port filter mask associated with the port.

If at step 228, the message does not correspond to a port filter, step 220 is performed by dropping the message. The switching node then returns to step 202 to listen for additional messages.

If at step 224, the message forwarded is not received by a load-sharing port, then step 230 is performed and the switching node returns to step 202 to listen for additional messages.

If at step 212, the message does not correspond to the load sharing port filter associated with the port upon which the message was received, step 220 is performed by dropping the message.

If at step 206, the switching node determines that the message was not received on a load sharing port (i.e., it was received through a non-load sharing port, such as designated port 73*a* in FIG. 5), step 232 is performed by accepting the message.

At step 234, the message is checked to determine whether it is a configuration message, and if so, step 210 is performed. Otherwise, step 236 is performed.

At step 236, an additional field (such as additional field 111 in FIG. 3) in a forwarding table entry is set to indicate that the message to be learned in that entry has been received through a non-load sharing port. Processing then returns to step 222. Note that if during the execution of step 222, the message was not previously learned, the message is learned using the forwarding table entry used in step 236.

While embodiments and applications of this invention have been shown and described, it would be apparent to those skilled in the art that many more modifications than mentioned above are possible without departing from the inventive concepts and scope herein. The invention, therefore, is not to be restricted except in the spirit of the appended claims.

What is claimed is:

1. A method for load sharing spanning tree non-configuration message traffic on more than one load sharing port of a non-root spanning tree protocol compliant node, the method comprising the steps of:
   assigning a first port filter to a first load sharing port and a second port filter to a second load sharing port in response to a spanning tree protocol port-blocking message; and
   directing a non-configuration message through one of said ports having a port filter which corresponds to said non-configuration message.

2. The method of claim 1, wherein said step of directing includes the step of transmitting said non-configuration message through said first load sharing port if said first port filter corresponds to a source address of said non-configuration message.

3. The method of claim 1, wherein said step of directing includes the step of transmitting said non-configuration message through said second load sharing port if said second port filter corresponds to a source address of said non-configuration message.

4. The method of claim 1, wherein said step of directing includes the step of receiving said non-configuration message through said first load sharing port if said first port filter corresponds to a destination address of said non-configuration message.

5. The method of claim 4, further including the steps of:
   including an additional bit position within said non-configuration message;
   configuring said additional bit position to indicate that said non-configuration message was received by one of the more than one load sharing ports;
   learning said non-configuration message and forwarding said non-configuration message to all ports within the node if said non-configuration message had not been previously learned and previously received on a non-load sharing port by the node; and
   dropping said non-configuration message if said non-configuration message had been previously learned and previously received on a non-load sharing port by the node.

6. The method of claim 5, wherein said step of learning includes storing in an entry in a forwarding table: a port designation corresponding to said first port, and a source address of said non-configuration message.

7. The method of claim 6, further including a step of using said forwarding table to determine which of the more than one load sharing ports to use when transmitting a non-configuration message.

8. The method of claim 6, wherein said step of directing includes a step of sending a non-configuration message to all of the more than one load sharing ports, if said forwarding table indicates that said non-configuration message is to be transmitted to one of the more than one load sharing ports.

9. The method of claim 5, further including the steps of:
   checking whether said additional bit position in said non-configuration message indicates that said non-configuration message was received by one of the more than one load sharing ports, if said non-configuration message is to be transmitted by one of the more than one load sharing ports;
   dropping said non-configuration message if said additional bit position in said non-configuration message signifies that said non-configuration message was received by a non-load sharing port;
   transmitting said non-configuration message if said non-configuration message is to be transmitted by a non-load sharing port;
   checking whether said non-configuration message corresponds to said first port filter or said second port filter if said additional bit position in said non-configuration message signifies that said non-configuration message was received by a non-load sharing port;
   dropping said non-configuration message if said non-configuration message does not correspond to said first port filter or said second port filter;
   transmitting said non-configuration message through said first load sharing port if said non-configuration message corresponds to said first port filter; and
   transmitting said non-configuration message through said second load sharing port if said non-configuration message corresponds to said second port filter.

10. The method of claim 1, wherein said step of directing includes the step of receiving said non-configuration message through said second load sharing port if said second port filter corresponds to a destination address of said non-configuration message.

11. The method of claim 10, further including the steps of:
    including an additional bit position within said non-configuration message;
    configuring said additional bit position to indicate that said non-configuration message was received by one of the more than one load sharing ports;
    learning said non-configuration message and forwarding said non-configuration message to all ports within the node if said non-configuration message had not been previously learned and previously received on a non-load sharing port by the node; and
    dropping said non-configuration message if said non-configuration message had been previously learned and previously received on a non-load sharing port by the node.

12. The method of claim 11, wherein said step of learning includes storing in an entry in a forwarding table: a port designation corresponding to said second port, and a source address of said non-configuration message.

13. The method of claim 12, further including a step of using said forwarding table to determine which of the more than one load sharing ports to use when transmitting a non-configuration message.

14. The method of claim 11, wherein said step of directing includes a step of sending a non-configuration message to all of the more than one load sharing ports, if said forwarding table indicates that said non-configuration message is to be transmitted to one of the more than one load sharing ports.

15. The method of claim 10, further including the steps of:
    checking whether said additional bit position in said non-configuration message indicates that said non-configuration message was received by one of the more than one load sharing ports, if said non-configuration message is to be transmitted by one of the more than one load sharing port;

dropping said non-configuration message if said additional bit position in said non-configuration message signifies that said non-configuration message was received by a non-load sharing port;

transmitting said non-configuration message if said non-configuration message is to be transmitted by a non-load sharing port;

checking whether said non-configuration message corresponds to said first port filter or said second port filter if said additional bit position in said non-configuration message signifies that said non-configuration message was received by a non-load sharing port;

dropping said non-configuration message if said non-configuration message does not correspond to said first port filter or said second port filter;

transmitting said non-configuration message through said first load sharing port if said non-configuration message corresponds to said first port filter; and transmitting said non-configuration message through said second load sharing port if said non-configuration message corresponds to said second port filter.

16. The method of claim 1, wherein said step of assigning includes the step of generating a filter value and a filter mask for said first port filter.

17. The method of claim 16, wherein said step of directing includes the step of transmitting a non-configuration message through said first port, if said first port filter has a filter value that matches a selected number of bits defined by a source address of said non-configuration message if said non-configuration message is to be transmitted from the node.

18. The method of claim 17, wherein said selected number of bits start from the least significant bit position of said source address and are specified by said filter mask.

19. The method of claim 16, wherein said step of directing includes the step of receiving a non-configuration message on said first port, if said first port filter has a filter mask that matches a selected number of bits defined by a destination address of said non-configuration message if said non-configuration message is to be received by the node.

20. The method of claim 19, wherein said selected number of bits start from the least significant bit position of said destination address and are specified by said filter mask.

21. The method of claim 1, wherein said step of assigning includes the step of generating a filter value and a filter mask for said second port filter.

22. The method of claim 21, wherein said step of directing includes the step of transmitting a non-configuration message through said second port, if said second port filter has a filter value that matches a selected number of bits defined by a source address of said non-configuration message if said non-configuration message is to be transmitted from the node.

23. The method of claim 22, wherein said selected number of bits start from the least significant bit position of said source address and are specified by said filter mask.

24. The method of claim 21, wherein said step of directing includes the step of receiving a non-configuration message on said second port, if said second port filter has a filter mask that matches a selected number of bits defined by a destination address of said non-configuration message if said non-configuration message is to be received by the node.

25. The method of claim 24, wherein said selected number of bits start from the least significant bit position of said destination address and are specified by said filter mask.

26. The method of claim 1, further including a step of sending a topology change notification through a root port in the node when the number of load sharing ports which are available for load sharing changes.

27. The method of claim 1, further including a step of using a forwarding table to indicate when said non-configuration message is received by the node through a non-load sharing port by:

creating an additional field in each forwarding table entry; and configuring said additional field to indicate that said non-configuration message was received by said non-load sharing port.

28. An apparatus for load sharing message traffic over more than one port, the apparatus comprising:

a network node having a plurality of ports, including a set of load sharing ports and a set of non-load sharing ports;

a memory for storing a port filter for each port within said set of load sharing ports;

means for applying said port filter to said each port in response to a spanning tree protocol port-blocking message; and means for directing a non-configuration message through one of said each port that has a port filter which corresponds to said non-configuration message.

29. The apparatus of claim 28, wherein said means for directing includes a transmitter that transmits said non-configuration message through said load sharing port having a port filter which corresponds to a source address of said non-configuration message if said non-configuration message is to be transmitted from the network node.

30. The apparatus of claim 29, further including a bit generator responsive to said transmitter, said bit generator setting a bit within a selected bit position within said non-configuration message when said non-configuration message is received through one of said load sharing ports, said selected bit position for signifying when said non-configuration message has been received through said one of said load sharing ports.

31. The apparatus of claim 30, further including a step of dropping a non-configuration message received by said one of said load sharing ports, if said non-configuration message has a selected bit position that signifies that said non-configuration message has been previously received through said one of said load sharing ports.

32. The apparatus of claim 28, wherein said means for directing includes a receiver that receives a non-configuration message through a port having a port filter which corresponds to a destination address of said non-configuration message if said non-configuration message is to be received by the network node.

33. The apparatus of claim 32, further including a forwarding table for learning a source address, and a port address used by said message traffic.

34. The apparatus of claim 33, further including a selection means for using said forwarding table to determine which of the plurality of ports to use when transmitting a non-configuration message.

35. The apparatus of claim 33, wherein said forwarding table includes an additional field in each table entry for indicating whether a learned non-configuration message has been received through one of said non-load sharing ports.

36. The apparatus of claim 33, wherein said means for directing includes a transmitter that sends a non-configuration message to all of said load sharing ports, if said memory store indicates that said non-configuration message is to be transmitted to one of said load sharing ports.

37. The apparatus in claim 28, wherein said port filter includes:
   a filter mask for specifying a number of bits within an address to monitor; and
   a filter value for specifying a value to use to match with said address.

38. The apparatus of claim 37, wherein said means for directing includes a transmitter that transmits a non-configuration message through a port corresponding to a port filter having a filter value that matches a selected number of bits defined by a source address of said non-configuration message if said non-configuration message is to be transmitted from the network node.

39. The apparatus of claim 38, wherein said selected number of bits start from the least significant bit position of said source address and are specified by said filter mask.

40. The apparatus of claim 37, wherein said means for directing includes a receiver that receives a non-configuration message through a port corresponding to a port filter having a filter mask that matches a selected number of bits defined by a destination address of said non-configuration message if said non-configuration message is to be received by the network node.

41. The apparatus of claim 40, wherein said selected number of bits start from the least significant bit position of said destination address and are specified by said filter mask.

42. A communications network, comprising:
   a first node and a second node, said first node having:
      at least a first port and a second port,
      a memory for storing at least a first port filter, and a second port filter,
      a filter device responsive to a spanning tree algorithm port-blocking message, said filter device applying said first port filter to said first port, and said second port filter to said second port when a spanning tree algorithm port-blocking message is received,
      means for directing message traffic over said first port when said message traffic corresponds to said first port filter, and over said second port when said message traffic corresponds to said second port filter; and
   said second node having at least a first port and a second port, said first port of said second node coupled to said first port of said first node, said second node selected as a root node for the communications network.

43. The communications network of claim 42, wherein said first node includes a third port, said third port coupled to a station.

44. The communications network claim 42, wherein said second node includes a third port, said third port coupled to a third node.

45. The communications network of claim 42, wherein said means for directing includes a transmitter that transmits a non-configuration message through said first port if said first port filter corresponds to a source address of said non-configuration message and if said non-configuration message is to be transmitted from the first node.

46. The communications network of claim 42, wherein said means for directing includes a transmitter that transmits a non-configuration message through said second port if said second port filter corresponds to a source address of said non-configuration message and if said non-configuration message is to be transmitted from the first node.

47. The communications network of claim 42, wherein said means for directing includes a receiver that receives a non-configuration message through said first port if said first port filter corresponds to a destination address of said non-configuration message if said non-configuration message is to be received by the first node.

48. The communications network of claim 42, wherein said means for directing includes a receiver that receives a non-configuration message through said second port if said second port filter corresponds to a destination address of said non-configuration message if said non-configuration message is to be received by the first node.

49. The communications network in claim 42, wherein said first port filter and said second port filter each include:
   a filter mask for specifying a number of bits within a address to monitor; and
   a filter value for specifying a value to use to match with said address.

50. The apparatus of claim 42, wherein said first node further includes a forwarding table for learning a source address and a port address used by said message traffic.

51. The apparatus of claim 50, further including a selection means for using said forwarding table to determine which of the plurality of ports to use when transmitting a non-configuration message.

52. The apparatus of claim 50, wherein said forwarding table includes an additional field in each table entry for indicating whether a learned non-configuration message has been received through one of a plurality of non-load sharing ports of said first node.

53. A method for providing an apparatus for load sharing message traffic over more than one port, the method comprising:
   providing a network node having a plurality of ports, including a set of load sharing ports and a set of non-load sharing ports;
   providing a memory for storing a port filter for each port within said set of load sharing ports;
   providing means for applying said port filter to said each port in response to a spanning tree protocol port-blocking message; and
   providing means for directing a non-configuration message through one of said each port that has a port filter which corresponds to said non-configuration message.

54. The method of claim 53, further including a step of providing a forwarding table having a table entry comprised of a field for storing a source address, a field for storing a port address, and an additional field for indicating whether a non-configuration message corresponding to said entry w as received through one of said non-load sharing ports.

55. A method for load sharing non-configuration message traffic on more than one load sharing port of a node, the node being within a loop free communication network, the method comprising the steps of:
   assigning a port filter to each operative load sharing port of the node in response to a spanning tree port-blocking message, said step of assigning including a step of generating a filter value and a filter mask for said port filter assigned to said each operative load sharing port of the node; and
   directing non-configuration message traffic by transmitting a non-configuration message from a load sharing port corresponding to a port filter having a filter value that matches a selected number of bits defined by a source address of said non-configuration message if said non-configuration message is to be transmitted from the node, and receiving a non-configuration message on a load sharing port corresponding to a port filter having a filter mask that matches a selected number of bits defined by a destination address of said non-configuration message if said non-configuration message is to be received by the node.

56. The method of claim 55, wherein said selected number of bits defined by said source address start from the least significant bit position of said source address and are specified by said filter mask.

57. The method of claim 56, wherein said selected number of bits defined by said destination address start from the least significant bit position of said destination address and are specified by said filter mask.

* * * * *